Patented Nov. 12, 1940

2,221,378

UNITED STATES PATENT OFFICE 2,221,378

PLASTIC AND PROCESS FOR PRODUCING SAME

Fred J. Heckel, Bradford, Pa.

No Drawing. Application January 22, 1940, Serial No. 315,109

12 Claims. (Cl. 134—79)

This invention relates to plastics and plastic compositions and it includes a new process for producing plastics and plastic compositions as well as new products made by the process. The invention provides a new process in which oily or tarry wastes resulting from the destructive distillation of wood are used in the production of new plastics and plastic compositions.

The destructive distillation of wood as commonly practiced involves the heating of wood in a suitable retort and the condensation of the vapors and gases given off by the wood as it is being heated. The condensate separates into two substantially immiscible layers. The bottom layer consists primarily of tar and the supernatant layer contains acetic acid, methyl alcohol, water, etc. and certain tars soluble in a mixture of these materials. The tar layer is commonly placed in a still known as a "raw tar still" where it is further heated in order to drive off methyl alcohol and acetic acid. The tarry residue resulting from this distillation is generally considered to be a waste product.

The supernatant layer is usually distilled in a copper still to separate acetic acid, methyl alcohol and acetone from the soluble tars. The soluble tars accumulate in the copper still and they are generally considered to be waste products. The distillate from the copper still is passed into a settling tank where a further quantity of tar may separate. This tar is also considered to be a waste product. From the settling tank the liquor containing acetic acid, methyl alcohol and acetone is passed into a still known as the "lime-lee" still where it is treated with lime and subjected to distillation. The distillate from the lime-lee still is a weak solution of methyl alcohol. This distillate is passed into a settling tank where a small quantity of oily or tarry matter may separate. This oil is sometimes referred to as "weak alcohol oil" and it is generally considered to be a waste product. The weak methyl alcohol liquor is distilled in a column still, sometimes referred to as a "naphtha still," with the production of a distillate containing about 80% of methanol. An oily residue collects in the bottom of the still and this oily material, commonly called "naphtha oil" or "alcohol oil," contains a small percentage of creosote. The remainder of the oily material, however, is generally considered to be a waste product, although when a satisfactory market is available, a portion of this oily material may be recovered and sold. The recovery of such a marketable portion of the oily material is effected by continuing the distillation in the column still after all the methanol has been distilled off. The distillate contains heavy oils and water and it is collected in a suitable tank from which the oils are drawn off. If no satisfactory market for such oils is available, the entire oily residue remaining in the column still after all the methanol has been distilled off is disposed of as a waste product.

The distillation of wood, as commonly practised, thus results in the production of a considerable quantity of waste oily or tarry matter. The residue from the raw tar still, oily or tarry matter from the copper still, oils from the lime-lee still, oils which collect in the naphtha still, etc., have all generally been discarded as waste products, although some of them have been used as fuels to heat the various stills and retorts used in the wood distillation process.

This invention provides a process in which these oily or tarry wastes, instead of being used as fuels or merely discarded as trade wastes, are used in producing new and useful plastics and plastic compositions. The new plastics and plastic compositions may be used as water-proofing materials, electrical insulation, coating materials, etc.

In accordance with the process of the invention, oily or tarry wastes resulting from the destructive distillation of wood are mixed with a cellulose ester, such as, for example, cellulose nitrate or cellulose acetate, and the resulting composition is subjected to distillation in order to drive off a substantial proportion of the volatile constituents of the mixture. As the distillation is continued, the composition becomes progressively thicker and the distillation is stopped when a product having the properties desired has been produced. The plastics may be quite flexible and rubber-like, or they may be rather hard and brittle, or of intermediate properties depending upon the degree to which the distillation has been carried. The proportions of cellulose ester and oily or tarry waste, as well as the particular kind of waste product used, will also affect the characteristics of the final product.

In general, oily or tarry wastes resulting from the destructive distillation of a variety of woods may be used in practicing the invention, although the wastes resulting from the destructive distillation of hardwood, such as beech wood, or a mixture of hardwood and softwood, or hardwood and cocoanut husks, etc., may be used with particular advantage. The oily or tarry wastes may be the residue from the raw tar still, or the oily or tarry matter collected from the copper still, or the weak alcohol oil, or the naphtha oil, etc.

These various oily or tarry wastes may be used either alone or in admixture. The wastes may also be subjected to distillation and a selected fraction used to produce the new products. In general, the fractions used are those distilling between 110 and 220° C. Thus, for example, weak alcohol oil may be distilled and the fraction distilling between 110 and 220° C. may be collected. This fraction may then be mixed with a cellulose ester and the resulting composition subjected to distillation to produce the new plastics. Selected fractions of the wastes may also be mixed with undistilled wastes or with other selected fractions in carrying out the process. The fractions may also be redistilled and selected fractions of the distillate may be collected and used in practicing the invention.

The proportions of oily or tarry matter and cellulose ester used in practicing the invention may be varied considerably depending somewhat on the kind of final product desired. In general, an increase in the proportion of cellulose ester will result in increased hardness of the final product. The amount of cellulose ester used is advantageously about 20 to 30% of the mixture which is to be subjected to distillation, although the amount of cellulose ester may be as low as about 1 or 2% or as high as about 40% or somewhat more, the maximum amount of cellulose ester added depending in general upon its solubility in the particular oily or tarry waste which is used. With cellulose nitrate, as much as about 45% of the mixture may be cellulose nitrate, whereas with cellulose acetate, the upper limit is around 40%. Enough oily or tarry waste should be used so that the cellulose ester is substantially completely dissolved before the distillation is begun. The oily residues will in general dissolve a larger amount of the cellulose ester than the more viscous tarry residues.

The oily or tarry wastes may be mixed with the cellulose ester at room temperature. Advantageously, however, the oily or tarry waste is heated to a temperature above room temperature, e. g., about 60 or 70° C., and the cellulose ester is then gradually added thereto.

The distillation may advantageously be carried out at temperatures of about 70 to 100° C. or even somewhat lower. Such temperatures may advantageously be obtained by distilling the mixture on a water bath. The distillation may also be conducted at higher temperatures and the temperatures may be as high as about 200 to 220° C. At the higher temperatures when using cellulose nitrate as the cellulose ester, care must be taken so that the cellulose nitrate is not completely decomposed. Slight decomposition of the cellulose nitrate is not objectionable. The volatile materials given off during the distillation may advantageously be collected and condensed. These materials contain solvent oils and also some oily or tarry matter and they may be used to prepare further quantities of the new plastics, that is, the distillate may be mixed with a cellulose ester, such as cellulose nitrate or cellulose acetate, and subjected to further distillation with the production of plastic compositions.

The period of time for which the mixture of cellulose ester and oily or tarry waste is distilled is variable. All other things being equal, the longer the distillation period the harder the final product will be. Also, distillation at high temperatures, e. g., at about 200° C., will require a shorter time than distillation at about 90° C. to produce a product having the same characteristics. Furthermore, with oily wastes, such as naphtha oil, a longer distillation period is necessary than when using a tarry waste, such as the residue from the raw tar still.

The distillation of the mixture of cellulose ester and oily or tarry waste is advantageously carried out at atmospheric pressure, although slight pressure or a vacuum may also be used. The distillation is advantageously carried out in a vessel which will make possible the collection of the vapors given off during the distillation.

Some of the products produced by the process may have an empyreumatic odor. If desired, this odor may be eliminated to a considerable extent by the addition of a substance such as camphor to the mixture which is subjected to distillation. Phenol also seems to be somewhat effective for this purpose.

The incorporation of phenol in the products also appears to make them somewhat tougher and more elastic. Products containing phenol are also somewhat less plastic at high temperatures than products containing no phenol. The phenol is introduced into the products by adding it to the mixture of the cellulose ester and the oily or tarry waste used in making the plastic. The amount of phenol used may vary from a few per cent up to about 12% of the mixture which is subjected to distillation.

The addition of a small quantity of rubber, such as Pará rubber, makes the products somewhat less plastic at high temperatures. The products also appear to be somewhat less elastic. The rubber is incorporated into the products by adding it to the mixture of cellulose ester and oily or tarry waste which is subjected to distillation.

The invention will be further described by reference to the following examples, it being understood that the invention is not intended to be limited thereto.

*Example 1.*—Weak alcohol oil was distilled and the fraction coming off at 110 to 210° C. was collected. This fraction was light lemon-yellow in color. It tends to darken in color on standing and it is, therefore, desirable to use it almost immediately after its production, if light colored plastic compositions are to be produced.

50 parts of this distillate were heated to a temperature of about 70° C. on a water bath. About 21.75 parts of cellulose acetate were then slowly added, the solution being stirred vigorously during the addition of the cellulose acetate. About 1.25 parts of camphor were also added. The mixture was then distilled by heating it on a water bath for about three hours, the temperature being between about 70 and about 90° C.

The product was a clear, amber-colored, tough, flexible, resilient material.

*Example 2.*—Weak alcohol oils were distilled and the fraction coming over at a temperature of between 110 and 200° C. was collected. This fraction also tends to darken on standing and should be used almost immediately after it is produced, if light colored plastic compositions are desired.

About 70 parts of the fraction were heated to about 70° C. and mixed with about 30 parts of cellulose acetate. The cellulose acetate was added gradually to the heated fraction, and after it was completely dissolved the mixture was subjected to distillation by heating it on a water bath at a temperature between about 70 and about 90° C. After about three hours the distillation was stopped.

The product was a soft, somewhat resilient, clear, brown material.

*Example 3.*—About 50 parts by weight of tarry matter from the copper still were heated to about 60 or 70° C. on a water bath. About 25 parts of cellulose acetate were then slowly added with stirring. When the cellulose acetate had all dissolved, the mixture was subjected to distillation by heating it to a temperature of about 70 to about 90° C. After about three hours the distillation was stopped.

The product was a dark-colored, opaque, tough, rubber-like material.

*Example 4.*—The oily material forming in the naphtha still was subjected to distillation and the fraction coming over at between 160 and 200° C. was collected.

About 73 parts of this fraction were heated to about 70° C. and about 27 parts of pyroxylin were then slowly added to the solution. When the cellulose nitrate had been completely dissolved the mass was subjected to distillation by heating it for about two hours at a temperature between 70 and 90° C.

The resulting product was a very tough, dark-colored, opaque material.

*Example 5.*—Weak alcohol oils were distilled and the fraction coming over between 200 and 215° C. was collected. About 80 parts by weight of this fraction were heated to about 60 to 70° C. About 20 parts of cellulose acetate were then slowly added with stirring. The resulting composition was then distilled at a temperature of about 70 to 90° C. for about two hours.

The resulting product was a clear, amber-colored, soft, somewhat elastic material.

*Example 6.*—About 4.5 parts by weight of tar from the copper still were heated to about 70 to 90° C. About 1.6 parts by weight of cellulose acetate were then slowly added with stirring. The resulting composition was then distilled at a temperature of about 100° C. for about three hours.

The resulting product was a black, tough, elastic material.

*Example 7.*—About 36 parts by weight of naphtha oil were heated to about 70° C. About 4 parts by weight of cellulose acetate were then slowly added with stirring. The resulting composition was then distilled at about 205° C. for about two hours.

The resulting product was a tough, black, somewhat elastic material.

*Example 8.*—About 9 parts by weight of tar from the raw tar still were heated to a temperature of about 70 to 90° C. About 3¾ parts of cellulose acetate were then slowly added with stirring. When the cellulose acetate was completely dissolved, the mixture was distilled at a temperature of about 100° C. for about three hours.

The resulting product was a black, tough, somewhat elastic material.

*Example 9.*—About 72 parts by weight of alcohol oil, i. e., oil from the naphtha still, were heated to a temperature of about 70 to 90° C. About 28 parts of cellulose acetate were then slowly added with stirring. When the cellulose acetate had completely dissolved the mixture was distilled at a temperature of about 195° C. for about two hours. The mixture should not be heated too rapidly during the distillation.

The resulting product was a tough, elastic material.

*Example 10.*—Weak alcohol oils which had already been subjected to distillation were redistilled and the fraction coming over at a temperature of between 110 and 200° C. was collected. The oil was lemon-colored and was used almost immediately since it tends to darken on standing.

About 63 parts of the fraction were heated to about 70° C. About 28 parts of cellulose acetate, about 7 parts of phenol, and 2 parts of camphor were then gradually added to the heated fraction. The resulting mixture was then distilled at a temperature of about 70 to 90° C. for about two hours.

The resulting product was a translucent, amber-colored, elastic material.

*Example 11.*—About 60 parts of the residue remaining in the distillation apparatus after the recovery of the fraction collected in Example 10 were heated to about 70° C. About 12 parts of phenol, about 2 parts of camphor, and about 26 parts of cellulose acetate were then slowly added. The resulting composition was then distilled at a temperature of about 70 to 90° C. for about three hours.

The resulting product was a dark, amber-colored, elastic, tough material.

*Example 12.*—About 82 parts by weight of tar from the copper still were heated to about 70° C. About 13 parts of cellulose acetate and about 5 parts of Pará rubber were then slowly added. The resulting composition was then distilled at a temperature of about 70 to 90° C. for about two hours.

The resulting product was a dark-colored, tough, elastic material.

*Example 13.*—About 66 parts by weight of tar from the raw tar still were heated to about 70° C. About 25 parts of cellulose acetate and about 9 parts phenol were then slowly added. The mixture was then distilled at a temperature of about 70 to 90° C. for about three hours. The mixture should be stirred during the distillation period.

The resulting product was a dark-colored, opaque, tough, elastic material.

*Example 14.*—About 55 parts by weight of oil from the naphtha or alcohol still were heated to about 70° C. About 45 parts of pyroxylin were then slowly added. The resulting composition was then distilled at a temperature of about 70 to 90° C. for about two hours.

The resulting product was a dark-colored, tough, elastic material.

Weak alcohol oils may also be used in the same proportion in making this product.

The new products are water repellent and may be used in producing water-proofing compositions. They may also be used in the manufacture of roofing materials and they also have properties which make them adaptable for use in the production of electrical insulation materials.

It will thus be seen that my invention provides a process in which new and valuable plastics and plastic compositions may be produced from the oily or tarry wood distillation wastes which have heretofore been discarded or used only for fuel purposes.

This application is a continuation-in-part of my application Serial No. 134,195, filed on March 31, 1937.

I claim:

1. A process for producing a plastic composition which comprises forming an intimate admixture of a cellulose ester and a material selected from the group consisting of oily and tarry wastes resulting from the destructive distillation of wood and their mixtures and distilling the admixture to remove a substantial proportion of its volatile constituents by heating it to a temperature not in excess of about 200 to 220° C.

2. A process for producing a plastic composition which comprises forming an intimate admixture of cellulose nitrate and a material selected from the group consisting of oily and tarry wastes resulting from the destructive distillation of wood and their mixtures and distilling the admixture to remove a substantial proportion of its volatile constituents by heating it to a temperature not in excess of about 200 to 220° C.

3. A process for producing a plastic composition which comprises forming an intimate admixture of cellulose acetate and a material selected from the group consisting of oily and tarry wastes resulting from the destructive distillation of wood and their mixtures and distilling the admixture to remove a substantial proportion of its volatile constituents by heating it to a temperature not in excess of about 200 to 220° C.

4. A process for producing a plastic composition which comprises distilling a material selected from the group consisting of oily and tarry wastes resulting from the destructive distillation of wood and their mixtures, collecting the fraction of distillate boiling between about 110 and about 220° C., forming an intimate admixture of said fraction and a cellulose ester and distilling the admixture to remove a substantial proportion of its volatile constituents by heating it to a temperature not in excess of about 200 to 220° C.

5. A process for producing a plastic composition which comprises forming an intimate admixture of a cellulose ester, phenol and a material selected from the group consisting of oily and tarry wastes resulting from the destructive distillation of wood and their mixtures and distilling the admixture to remove a substantial proportion of its volatile constituents by heating it to a temperature not in excess of about 200 to 220° C.

6. A plastic composition produced by the process of claim 1.

7. A plastic composition produced by the process of claim 4.

8. A plastic composition produced by the process of claim 5.

9. A process for producing a plastic composition which comprises forming an intimate admixture of a cellulose ester, camphor and a material selected from the group consisting of oily and tarry wastes resulting from the destructive distillation of wood and their mixtures and distilling the admixture to remove a subtantial proportion of its volatile constituents by heating it to a temperature not in excess of about 200 to 220° C.

10. A process for producing a plastic composition which comprises forming an intimate admixture of a cellulose ester, rubber and a material selected from the group consisting of oily and tarry wastes resulting from the destructive distillation of wood and their mixtures and distilling the admixture to remove a substantial proportion of its volatile constituents by heating it to a temperature not in excess of about 200 to 220° C.

11. A plastic composition produced by the process of claim 9.

12. A plastic composition produced by the process of claim 10.

FRED J. HECKEL.